United States Patent [19]

Futamura

[11] Patent Number: 4,940,872
[45] Date of Patent: Jul. 10, 1990

[54] ELECTRIC DISCHARGE MACHINING CIRCUIT

[75] Inventor: Shoji Futamura, Kawasaki, Japan

[73] Assignee: Institute of Technology Precision Electrical Discharge Works, Kanagawa, Japan

[21] Appl. No.: 143,735

[22] Filed: Jan. 13, 1988

[30] Foreign Application Priority Data

Jan. 16, 1987 [JP] Japan .................. 62-7675

[51] Int. Cl.$^5$ ............................. B23H 1/02
[52] U.S. Cl. ..................... 219/69.13; 219/69.18
[58] Field of Search ........... 219/69 C, 69 P, 69.13, 219/69.18; 323/286, 287, 285, 282, 288, 351

[56] References Cited

U.S. PATENT DOCUMENTS

| | | | |
|---|---|---|---|
| 4,672,303 | 6/1987 | Newton | 323/288 |
| 4,710,603 | 12/1987 | Obara | 323/287 |
| 4,727,308 | 2/1988 | Huljak et al. | 323/287 |

FOREIGN PATENT DOCUMENTS

| | | | |
|---|---|---|---|
| 184629 | 11/1982 | Japan | 219/69 C |
| 123218 | 7/1985 | Japan | 219/69 C |

Primary Examiner—Philip H. Leung
Assistant Examiner—Geoffrey S. Evans
Attorney, Agent, or Firm—McGlew & Tuttle

[57] ABSTRACT

A discharge machining apparatus adapted to quickly absorb the energy, which has been accumulated by an inductance component during discharge machining, during the non-discharge period. The accumulated energy is absorbed as it is caused to flow as a current in an equivalent resistor having a resistance varying function. With this invention, it becomes possible to increase the frequency of discharges per unit time since the energy is quickly absorbed without residue as the change in the resistance value of the equivalent resistor causes the current flowing in it to shift from an oscillating state to a normal damping state.

5 Claims, 5 Drawing Sheets

ELECTRIC DISCHARGE MACHINING CIRCUIT

BACKGROUND OF THE INVENTION

1. FIELD OF THE INVENTION

This invention relates generally to a discharge machining apparatus, and more particularly to a discharge machining apparatus in which the voltage applied across an electrode and a workpiece is supplied via a main transistor controlled by a pulse signal; the discharge machining apparatus adapted to positively and quickly absorb the energy released by an inductance on a power feeding path when the main transistor is turned off.

2. DESCRIPTION OF THE PRIOR ART

In a discharge machining apparatus, an electric discharge is generated by applying a voltage across an electrode and a workpiece to machine the workpiece by means of the generated discharge energy. In such a discharge machining apparatus, when a voltage is continuously impressed across the electrode and the workpiece, a so-called concentrated discharge takes place, leading to an unwanted discharge machining state. To cope with this, an arrangement is generally employed in which the voltage is applied across the electrode and the workpiece in a pulse voltage mode by means of a switching transistor.

FIG. 9 shows a circuit configuration of a discharge machining apparatus having such a construction. In the figure, reference numeral 1 refers to a main transistor; 1B to the base terminal of the main transistor 1; 2 to an electrode; 3 to a workpiece; 4 to a d-c power supply; 5 to a resistor; 7 to a power feeding path; and 41 is a diode, respectively. As is well known, the operation of this circuit is such that pulse voltages are fed across the electrode 2 and the workpiece 3 by the action of the main transistor 1 that turns on and off in accordance with the pulse signals fed to the base terminal 1B.

During actual discharge machining, however, a phenomenon called pulse interruption may occur, in which discharge is instantaneously interrupted and then restored immediately due to a change in a discharge gap between the electrode 2 and the workpiece 3, for example. This pulse interruption tends to occur when the machining surface is too large, or the capacitance of a power feeding path is too high, or under machining conditions as found in finish machining, where the peak value of current is too low and the discharge gap is too small, relative to the machining area. The pulse interruption causes the electrode to wear rapidly.

To cope with this, it has heretofore been practiced that an inductor 6 is added to a power feeding path 7 having such a circuit configuration as shown in FIG. 9 so that the pulse interruption is avoided by releasing the energy ($Li^2/2$ stored in the inductor 6 by means of a newly added diode 42, as shown in FIG. 10. The voltage and current waveforms obtained in the circuit configuration shown in FIG. 10 are shown in FIG. 11. In FIG. 11, ① is the voltage waveform of a pulse signal fed to the base terminal 1B; ② the voltage waveform across the emitter and collector of the main transistor 1; ③ the voltage waveform across the electrode 2 and the workpiece 3; and ④ the current waveform of the current i shown in FIG. 10.

As shown in the figure, after the main transistor 1 has been turned off, the energy stored in the inductor 6 is released relatively rapidly by a current flowing via the the current flowing via the diode 42 assumes a damping mode while oscillating at a frequency determined by the circuit resistance. Consequently, the current actually keeps flowing without settling to "zero" due to the oscillation. This brings about a state close to short circuiting between the electrode Z and the workpiece 3 during discharge machining; if the energy ($Li^2/2$ stored in the inductor 6 is increased as the peak value of discharge current increases, the current released by the inductor 6 cannot subside completely before the next pulse signal is input, causing voltages to be successively applied across the electrode 2 and the workpiece 3. This could lead to the occurrence of a concentrated discharge. The concentrated discharge may disrupt discharge machining, resulting in lowered machining speed, or the deteriorated accuracy of the machining surface, or an electrode breakage in the wire discharge machining apparatus.

As a method for solving this serious problem, it has been conceived that the current released by the inductor 6 is caused to subside completely by providing a longer time before the next pulse signal is input. This method, however, may give rise to deteriorated machining efficiency.

This invention has been conceived in the light of these circumstances, and is intended to provide a discharge machining apparatus that is capable of positively and rapidly absorbing the energy released by the inductance of a power feeding path when a main transistor is turned off.

SUMMARY OF THE INVENTION

It is an object of this invention to provide a discharge machining apparatus of an ON-OFF control type using a transistor in which the energy released by the inductance of a power feeding path generated when the transistor is turned off. By achieving this object, this invention is intended to prevent the occurrence of concentrated discharge and increase machining efficiency by reducing non-power feeding time.

To accomplish this object, this invention has such a construction that an energy dissipating circuit provided in parallel with the discharge gap performs an energy dissipating action for a predetermined period of time after the transistor is turned off, and that the resistance value of an equivalent resistor provided in the energy dissipating circuit for causing an energy dissipating current to flow is increased with the lapse of time during a predetermined period of time.

With such a construction, the energy can be absorbed rapidly as a large oscillating energy dissipating current flows because the resistance value of the equivalent resistor remains low when the transistor is turned off, and as the resistance value of the equivalent resistor increases subsequently, no oscillating energy is left because the oscillation of the energy dissipating current stops and disappears.

DESCRIPTION OF THE PREFERRED EMBODIMENTS

In the following, this invention will be described in more detail.

Figure 1:
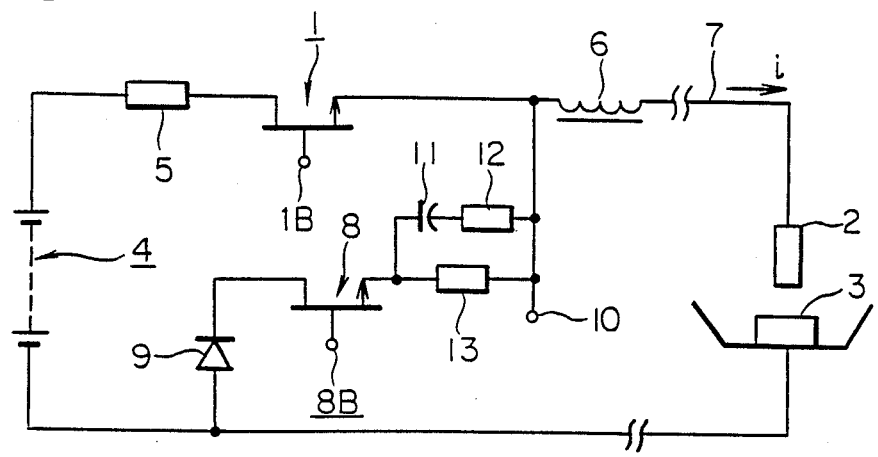
FIG. 1—Diagram illustrating the construction of an embodiment of this invention.
Figure 10:
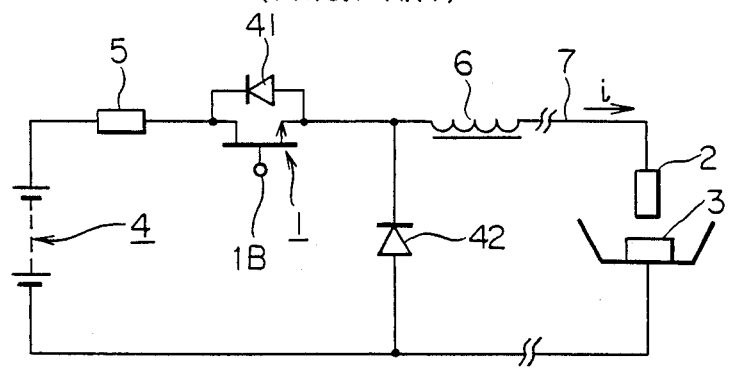
FIG. 10—Diagram illustrating the circuit configuration of a conventional discharge machining apparatus having an inductor.
Figure 11:
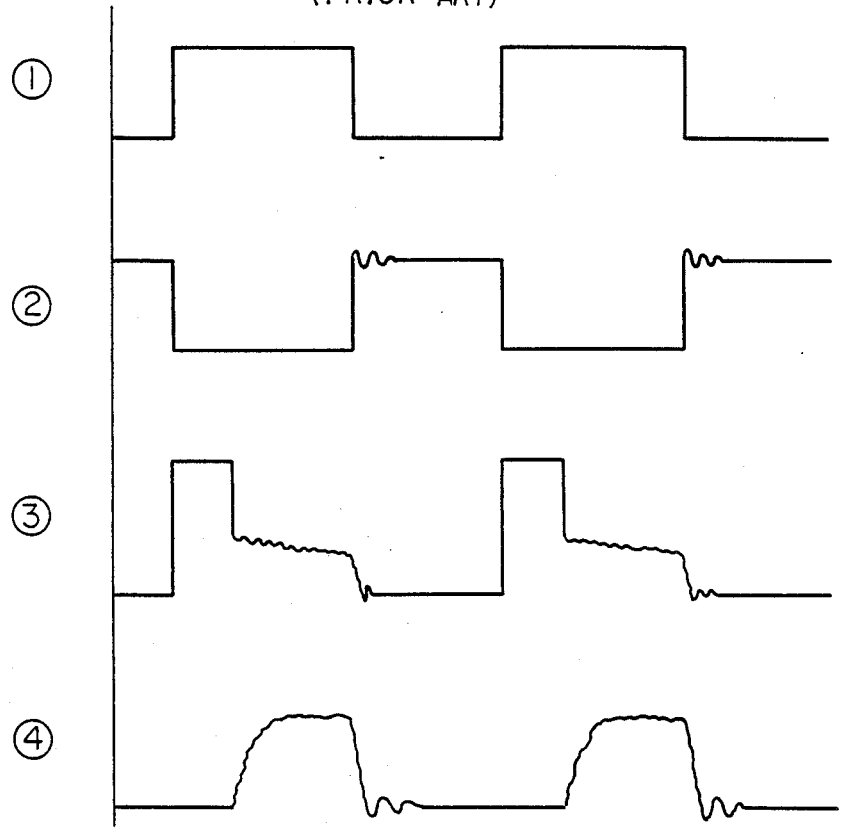
FIG. 11—Voltage and current waveforms at key points in the circuit of the conventional discharge machining apparatus shown in FIG. 10.

FIG. 1 is a diagram illustrating the construction of an embodiment of this invention. In the figure, the same parts as shown in FIG. 10 are indicated by corresponding numerals throughout. Reference numeral 8 refers to a transistor; 8B to a base terminal of the transistor 8; 9 to a diode; 10 to a terminal; 11 to a capacitor; and 12 and 13 to resistors, respectively. As shown in the figure, a series circuit comprising the resistor 12, the capacitor 11, the transistor 8 and the diode 9 is provided in parallel with a series circuit comprising the inductor 6, the electrode 2 and the workpiece 3; with the resistor 13 being connected in parallel with a series circuit comprising the resistor 12 and the capacitor 11. The main transistor 1 and the transistor 8 may be either an ordinary transistor or an FET transistor.

Figure 2:
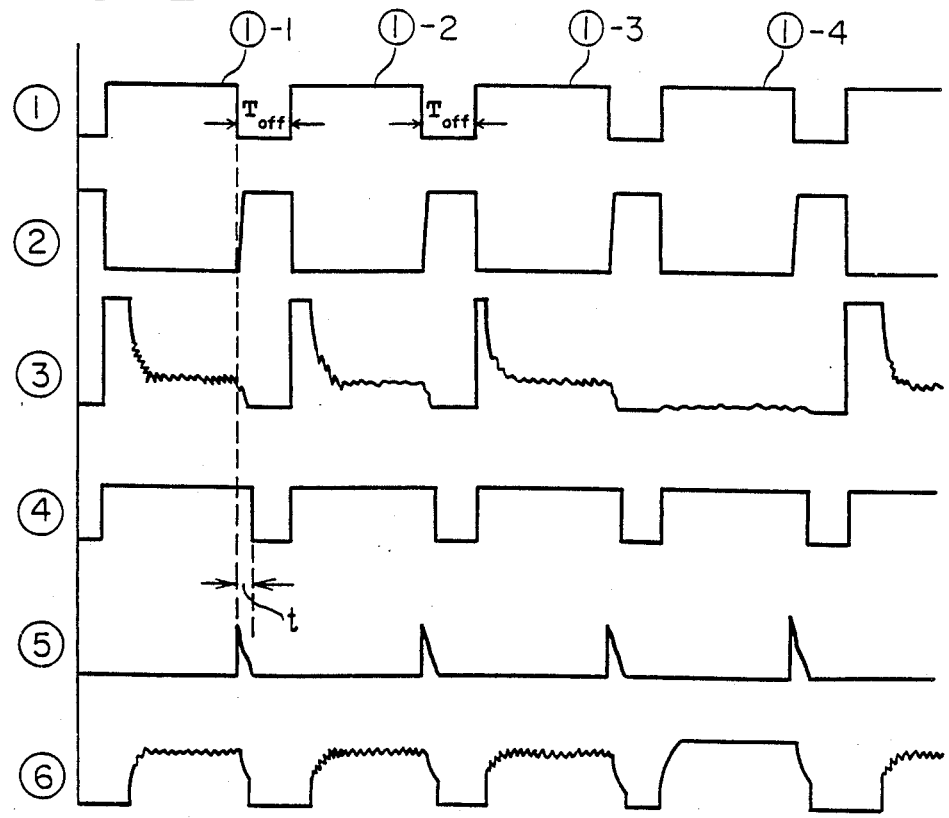
FIG. 2—Voltage and current waveforms at key points in the circuit of the embodiment shown in FIG. 1.

Next, the operation of this embodiment will be described, referring to FIG. 2 indicating voltage and current waveforms at key points of the circuit of this embodiment. In FIG. 2, ① is a diagram illustrating the voltage waveform of a pulse signal fed to the base terminal 1B, ② is a diagram illustrating the waveform of a voltage across the emitter and collector of the main transistor 1, ③ is a diagram illustrating the waveform of a voltage across the electrode 2 and the workpiece 3, ④ is a diagram of the voltage waveform of a pulse signal fed to the base terminal 8B, ⑤ is a diagram of the current waveform of the collector current of the transistor 8, and ⑥ is a diagram of the current waveform of the current i shown in FIG. 1.

A pulse signal alternating HI/LO levels is fed to the base terminal 1B of the main transistor 1 at a predetermined frequency as shown in FIG. 2 ①. As this pulse signal is changed to the HI level, the main transistor 1 is turned on, causing the voltage of the d-c power supply 4 to be applied across the electrode 2 and the workpiece 3 via the inductor 6, as shown in FIG. 2 ③. With this voltage application, electric discharge is produced across the electrode 2 and the workpiece 3. With the commencement of discharge, the discharge current i begins flowing, as shown in FIG. 2 ⑥, and the voltage across the electrode 2 and the workpiece 3 drops to a predetermined level, as shown in FIG. 2 ③. The electric discharge sustained in this state is terminated as the pulse signal is changed to the LO level, turning off the main transistor 1.

The voltage waveform shown in FIG. 2 ④ is a pulse signal fed to the base terminal 8B of the transistor 8. This pulse signal is synchronized at the rising timing thereof with the pulse signal shown in FIG. 2 ①, and delayed at the falling timing thereof by a predetermined time interval (shown by t in FIG. 2) behind the falling timing of the pulse signal shown in FIG. 2 ①. Consequently, the transistor 8 is turned on simultaneously with the main transistor 1, and turned off after the lapse of a predetermined time t after the main transistor 1 is turned off.

The collector current of the transistor 8 operating in this way does not flow even when the transistor 8 is turned on until the main transistor 1 is turned off due to the reverse-current preventing effect of the diode 9, as shown in FIG. 2 ⑤, and starts flowing while absorbing the energy $Li^2/2$) stored in the inductor 6 after the main transistor 1 is turned off. At this time, a parallel circuit formed on the emitter side of the transistor 8 by the series circuit comprising the capacitor 11 and the resistor 12, and the resistor 13 acts like an equivalent resistor whose resistance value increases from "zero" with time with respect to the collector current in equivalent terms, due to the charging characteristics of the capacitor 11.

Figure 3:
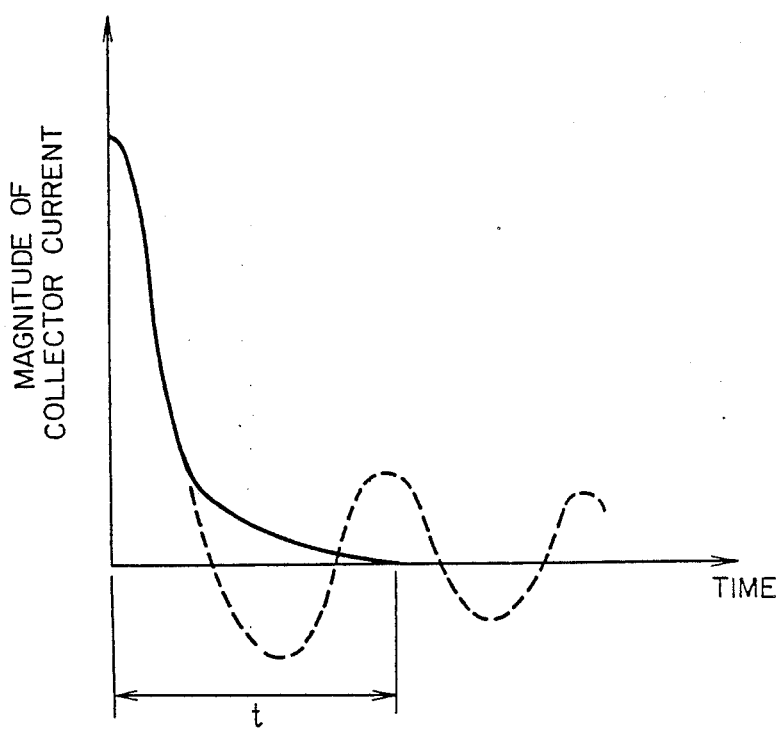
FIG. 3—Diagram of assistance in explaining the operation of this invention.

It follows from this that when the main transistor 1 is turned off, the circuit configuration becomes equal to that shown in FIG. 10, so the collector current of the transistor 8 sharply drops from a larger value shown in FIG. 3 due to the oscillating characteristics. As the flow of the collector current increases the equivalent resistance value of the parallel circuit containing the capacitor 11, the collector current deviates from the oscillating conditions, and does not oscillate but just damps and settles to "zero," though it comes to have a relatively large time constant, as shown in FIG. 3. Consequently, the energy released by the inductor 6 can be positively and rapidly absorbed by setting the delay time t of the falling timing between the pulse signals input to the aforementioned base terminal 1B and the base terminal 8B at a damping time at which the collector current becomes "zero". On the contrary, if the concept of deviating& the collector current from the oscillating conditions using the change in the resistance value of the equivalent resistor, as in the case of this invention, is not employed, turning off the transistor 8 before a sufficient time is elapsed could cause the remaining oscillating energy in the inductor 6 to flow from the collector side into the main transistor 1, destructing the main transistor 1.

The time zone corresponding to the pulse signal ①-4 (the fourth pulse signal; the same applies hereinafter) in FIG. 2 indicates that a short circuiting or a state of discharge close to short circuiting occurs. In this discharge state, the energy released by the inductor 6 when the main transistor 1 is turned off is naturally increased, but the released energy can be absorbed effectively as the collector current of the transistor 8 flows corresponding to the released energy. The discharge of the capacitor 11 for the next cycle is effected by means of the resistor 13 when the transistor 8 is turned off.

As described above, in the normal discharge state in the time zones corresponding to the pulse signals ①-1 through ①-3 in FIG. 2 (1), or in a state of short circuiting or discharge close to short circuiting in the time zone corresponding to the pulse signal ①-4, the energy released by the inductor 6 when the main transistor 1 is turned off can be effectively absorbed.

Figure 4:
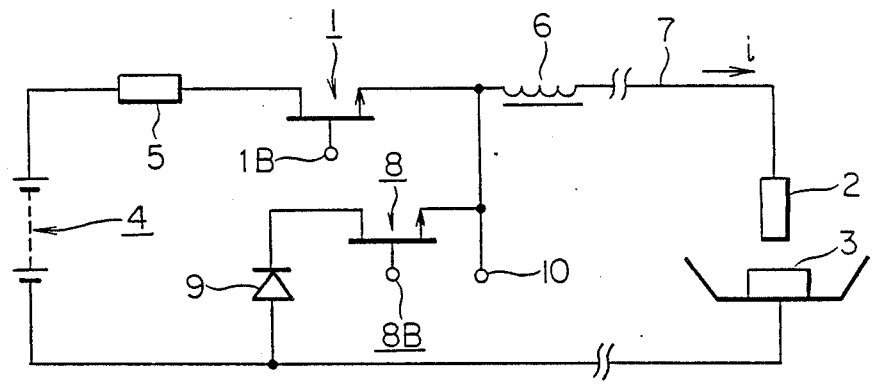
FIG. 4—Diagram illustrating the construction of another embodiment of this invention.
Figure 5:
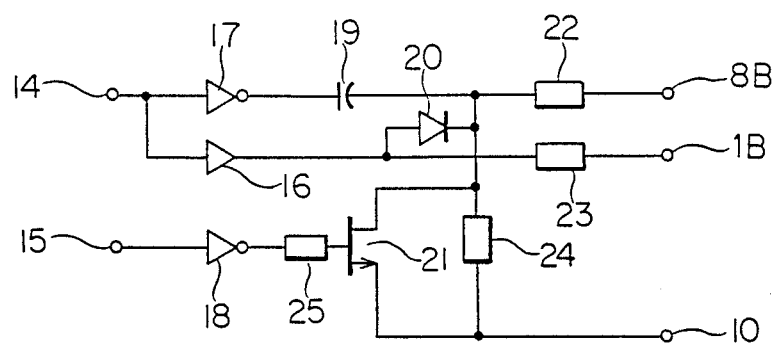
FIG. 5—Transistor control circuit for controlling the transistor used in the embodiment shown in FIG. 4.

Next, another embodiment shown in FIGS. 4 and 5 will be described. In FIG. 4, the same parts as shown in FIG. 1 are indicated by corresponding numerals throughout. As shown in the figure, this embodiment has a series circuit comprising the transistor 8 and the diode 9 connected in parallel with a series circuit comprising the inductor 6, the electrode 2 and the workpiece 3. FIG. 5 shows a transistor control circuit for controlling the main transistor 1 and the transistor 8 in FIG. 4. In the figure, reference numerals 14 and 15 refer to terminals; 16 to an amplifier; 17 and 18 to inverted amplifiers; 19 to a capacitor; 20 to a diode; 21 to a transistor; and 22 through 25 to resistors, respectively. Terminals 1B, 8B and 10 in FIG. 5 are connected to the base terminal 1B of the main transistor 1, the base terminal 8B of the transistor 8, and the terminal 10 shown in FIG. 4, respectively.

Figure 6:
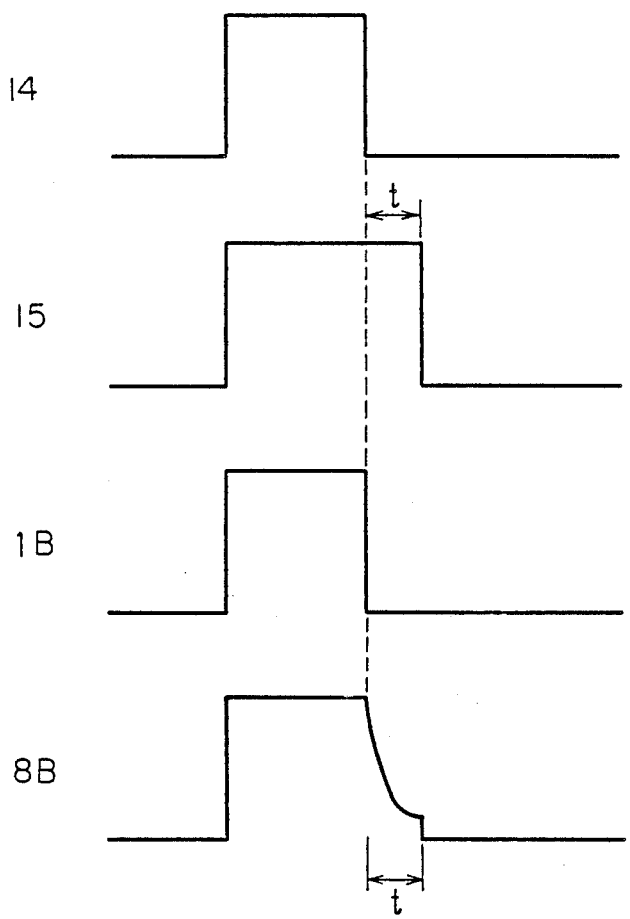
FIG. 6—Voltage waveforms in the transistor control circuit shown in FIG. 5

The voltage waveforms of the pulse signals fed to the terminals 14 and 15 of the transistor control circuit shown in FIG. 5 are shown in FIG. 6.

As shown in the figure, a pulse signal which is synchronized with the pulse signal fed to the terminal 14 at the rising timing and delayed by a predetermined time interval shown by t in FIG. 6) at the falling timing is input to the terminal 15. The voltage waveforms of the pulse signals appearing as outputs on the terminals 1B and 8B of the transistor control circuit as these pulse signals are input to the terminals 14 and 15 are also shown in FIG. 6. As shown in the figure, a pulse signal having the same waveform as the pulse signal fed to the terminal 14 is output to the terminal 1B via the amplifier 16 and the resistor 23. Furthermore, a pulse signal having a waveform which gradually decreases while the transistor 21 is kept turned on from the time when the pulse signal input to the terminal 14 is changed to the LO level by the discharge action of the capacitor 19 is output to the terminal 8B.

Figure 7:
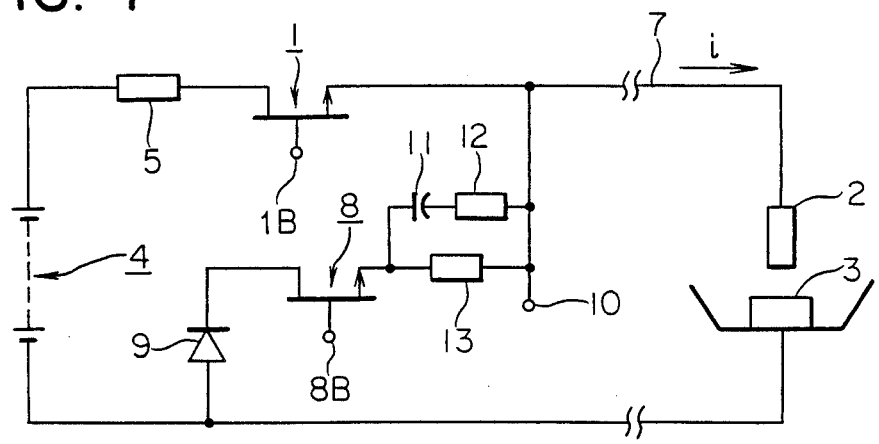
FIG. 7—Diagram illustrating the construction of an embodiment in which this invention is applied to a discharge machining apparatus having no inductor.
Figure 8:
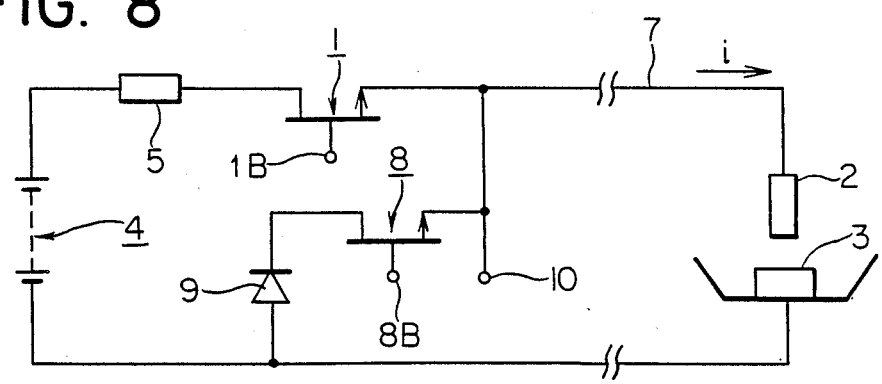
FIG. 8—Diagram illustrating the construction of another embodiment in which this invention is applied to a discharge machining apparatus having no inductor.
Figure 9:
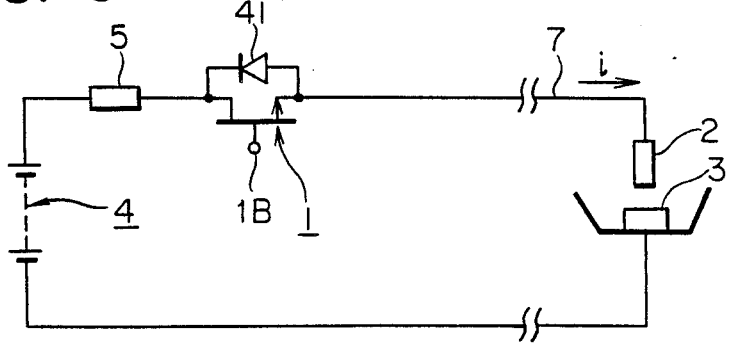
FIG. 9—Diagram illustrating the circuit configuration of a conventional discharge machining apparatus having no inductor.

When a pulse signal having such a waveform is input to the base terminal 8B of the embodiment shown in FIG. 4 from the terminal 8B in the transistor control circuit the resistance value across the collector and emitter of the transistor 8 is increased with time from almost "zero" at the OFF time of the main transistor 1. Consequently, the energy released by the inductor 6 can be positively and rapidly absorbed in this embodiment, as with the embodiment shown in FIG. 1, by the action of the transistor 8 as an equivalent resistor In the embodiments shown in FIGS. 1 and 4, description has been made based on a discharge machining apparatus having an inductor 6 in the power feeding path 7. This invention, however, is not limited to it but can be applied to a discharge machining apparatus having no inductor 6 in the power feeding path 7 to release the energy stored in the inductance of the power feeding path 7 itself. Embodiments of this invention for such a case are shown in FIGS. 7 and 8. The embodiment shown in FIG. 7 corresponds to the embodiment shown in FIG. 1, while the embodiment shown in FIG. 8 to that shown in FIG. 4. In a discharge machining apparatus in which discharge current is set to a large value, or in which discharge current is increased as a state close to short circuiting occurs between the electrode and the workpiece, the stored energy tends to become larger even when the inductance of the power feeding path 7 itself is low. In such cases, these embodiments are particularly effective.

As described above, this invention makes it possible to positively and rapidly absorb the energy released by the inductance of the power feeding path when the transistor is turned off in a discharge machining apparatus of an ON-OFF control type using a transistor. Thus, concentrated discharge can be avoided even when an inductor is provided to prevent a pulse interruption. This invention, which also reduces the non-power feeding time, helps improve machining efficiency as well as the surface accuracy of the machining surface. The ON/OFF control transistor used in this invention can be protected from damage because no large surge voltage is applied to the transistor. Moreover, this invention makes it possible to materially reduce the frequency of electrode breakage in a wire discharge machining apparatus because current is not allowed to flow continuously.

What is claimed is:

1. A discharge machining apparatus having a main switching means that performs an ON-OFF operation based on a control signal and carries out discharge machining by applying voltage across an electrode and a workpiece via a power feeding path in accordance with the ON-OFF operation of said main switching means, comprising an energy dissipating circuit which dissipates the energy stored in an inductor provided in said power feeding path or an inductance component of said power feeding path by causing said stored energy to flow in the form of a current is connected in parallel with a discharge gap between said electrode and said workpiece; said energy dissipating circuit having at least one transistor switched on at or prior to the time the main switching means switches off the voltage application and said at least one transistor switching off after a predetermined period of time from the time the switching means switches off the voltage application, said predetermined period of time being shorter than the off operation time period of the switching means between voltage applications; the resistance value of an equivalent resistor provided in said energy dissipating circuit for causing an energy dissipating current being set so as to increase with time within said predetermined period of time.

2. A discharge machining apparatus as claimed in claim 1 wherein said energy dissipating circuit includes a capacitor means, said capacitor means having discharge characteristics for realizing said equivalent resistor whose resistance value increases with time.

3. A discharge machining apparatus arrangement comprising: main switching means switchable on and off in response to a control signal for carrying out discharge machining by applying a voltage across an electrode and a workpiece via a power feeding path, upon said switching means being switched on; energy dissipating means for dissipating energy stored in the power feeding path, due to the inductance of the power feeding path, said energy dissipating means being positioned in parallel with a discharge gap formed between said electrode and said workpiece to allow energy to flow in the form of current in an on-state of said energy dissipating means, said energy dissipating means being switchable on at or prior to said main switching means being switched off, ending the application of the voltage, and said energy dissipating means being switched off after a predetermined period of time from the switching means being switched off, ending the application of the voltage, said predetermined period of time being shorter than the period of time said main switching means is switched off; said energy dissipating circuit providing an equivalent resistance which varies for causing a dissipating current to increase with time during said predetermined period of time.

4. A discharge machining apparatus according to claim 3, wherein said energy dissipating means includes a transistor controllable to provide equivalent resistance value which increases with time during said predetermined period of time.

5. A discharge machining apparatus arrangement according to claim 3, wherein said energy dissipating means includes a capacitor having a discharge characteristic value providing an equivalent resistance value which increases with time during said predetermined period of time.

* * * * *